United States Patent
Illerhaus

(10) Patent No.: US 7,817,419 B2
(45) Date of Patent: Oct. 19, 2010

(54) SOLAR INVERTER ASSEMBLY

(75) Inventor: Edmund Illerhaus, Bergatreute (DE)

(73) Assignee: Diehl AKO Stiftung & Co. KG, Wangen (DE)

( * ) Notice: Subject to any disclaimer, the term of this patent is extended or adjusted under 35 U.S.C. 154(b) by 538 days.

(21) Appl. No.: 11/807,278

(22) Filed: May 25, 2007

(65) Prior Publication Data
US 2007/0279863 A1 Dec. 6, 2007

(30) Foreign Application Priority Data
Jun. 1, 2006 (DE) .................. 20 2006 008 792 U

(51) Int. Cl.
H05K 7/20 (2006.01)
(52) U.S. Cl. .................. 361/692; 361/690; 361/695; 361/697; 165/104.33; 454/184
(58) Field of Classification Search .......... 361/679.33, 361/695, 697, 699, 700, 719, 679.46, 690, 361/692; 165/11.1, 80.3, 104.21, 104.33, 165/121, 122; 454/184, 228; 700/300
See application file for complete search history.

(56) References Cited

U.S. PATENT DOCUMENTS

| | | | | |
|---|---|---|---|---|
| 6,742,583 | B2 * | 6/2004 | Tikka | 165/291 |
| 7,573,713 | B2 * | 8/2009 | Hoffman et al. | 361/697 |
| 2006/0120001 | A1 * | 6/2006 | Weber et al. | 361/103 |
| 2007/0076355 | A1 * | 4/2007 | Oohama | 361/676 |

FOREIGN PATENT DOCUMENTS

DE  10 2004 030 457 A1   1/2006

* cited by examiner

*Primary Examiner*—Jayprakash N Gandhi
*Assistant Examiner*—Courtney Smith
(74) *Attorney, Agent, or Firm*—Laurence A. Greenberg; Werner H. Stemer; Ralph E. Locher

(57) ABSTRACT

A solar inverter assembly has a first housing part, which is used as a heat sink, and a second housing part for holding electronic components of the solar inverter. The first housing part has a first air inlet opening, a first air outlet opening and a first air channel connecting the air inlet and air outlet openings. Air flows on the basis of natural convection through the first air channel. The second housing part has a second air inlet opening, a second air outlet opening, and a second air channel which connects the second air inlet opening to the second air outlet opening. Air flows on the basis of natural convection through the second air channel. At least one electronic component, which is insensitive to dust, of the solar converter, for example a transformer or an inductor, is mounted in the second housing part in direct thermal contact with the first housing part and within the second air channel. Those electronic components of the solar inverter that are sensitive to dust are in contrast arranged in the second housing part, separated in a dust-tight manner by a separating wall from the second air channel, and make indirect thermal contact with the first housing part. A solar inverter such as this ensures high cooling power for its electronic components, and at the same time the high ingress-protection class.

8 Claims, 1 Drawing Sheet

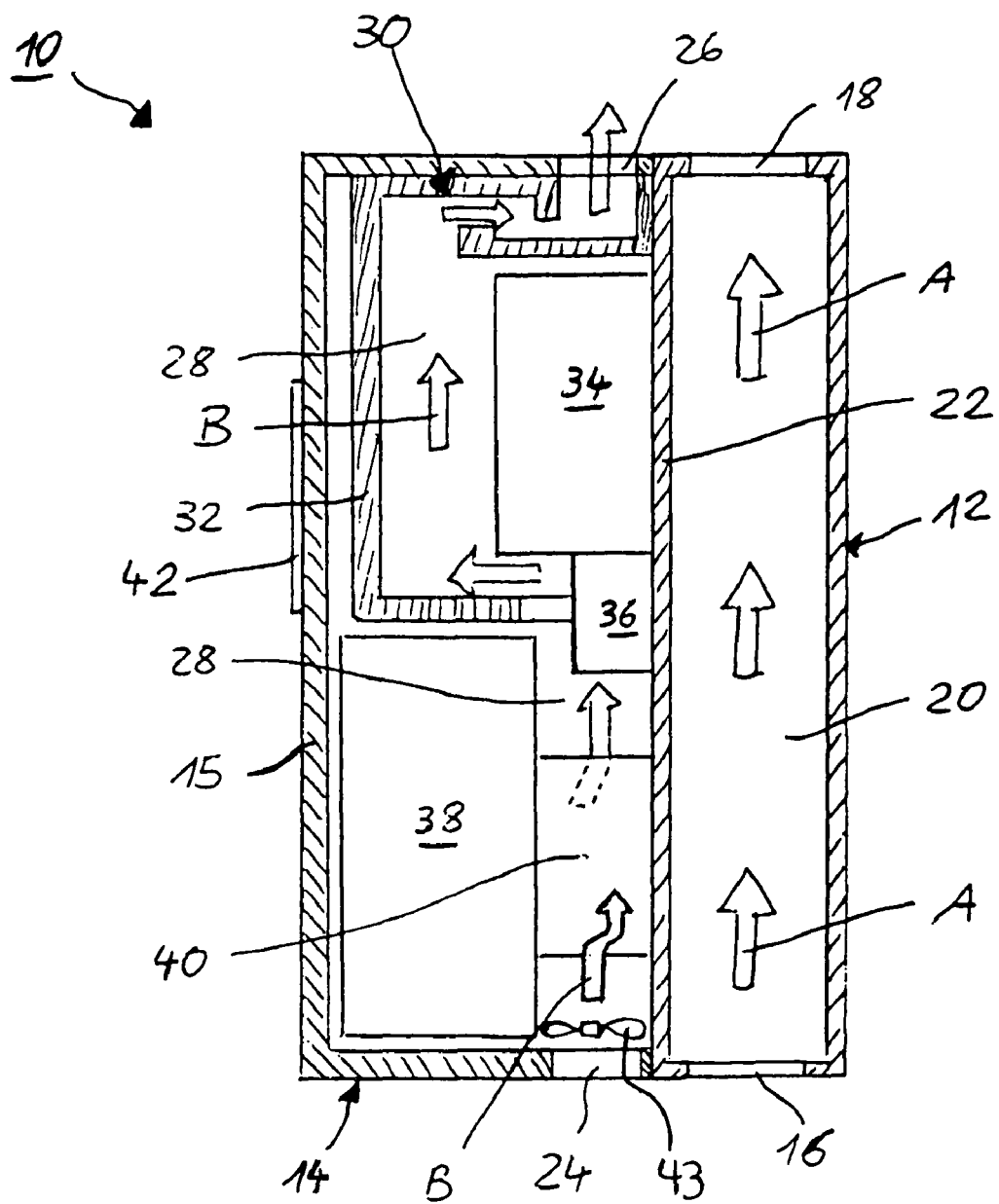

SOLAR INVERTER ASSEMBLY

CROSS-REFERENCE TO RELATED APPLICATION

This application claims the priority, under 35 U.S.C. §119, of German application DE 20 2006 008 792.3, filed Jun. 1, 2006; the prior application is herewith incorporated by reference in its entirety.

BACKGROUND OF THE INVENTION

Field of the Invention

The present invention relates to a solar inverter having a heat sink for cooling the electronic components in the solar inverter, and in particular to a solar inverter such as this which meets the requirements for a high ingress-protection class, in terms of dirt, dust and moisture.

Solar inverters are part of photovoltaic installations that are used to feed electrical power into an electrical mains system. For this purpose, the photovoltaic installations have one or more photovoltaic generators, which each comprise one or more solar modules, which in turn may have a multiplicity of solar cells connected to one another. The electrical energy which is generated photovoltaically by the solar cells is then supplied to a solar inverter, which converts the DC voltage supplied to it to a regulated, standardized mains voltage.

These solar inverters in general contain a number of heat-generating electronic components, for example low-frequency transformers, inductors and power semiconductors, which must be cooled. Since the solar inverters are also fitted outside buildings, they must also be protected against the ingress of dust, dirt and water spray in order, for example, to meet the requirements for ingress-protection class IP 54 (dust protection, splash protection).

In principle, the electronic components in the solar inverter can be cooled by passing cooling air directly through the housing and past the components. However, this does not allow adequate protection of the electronic components against dust and moisture. It is therefore common for the solar inverter to be provided with a heat sink through which the cooling air is passed, and for the electronic components to be thermally conductively connected to the heat sink. Since, in this case, the electronic components do not come into contact with the cooling air, the cooling power provided by the heat sink is, however, not always adequate, although a high ingress-protection class can be satisfied.

German published patent application DE 10 2004 030 457 A1 describes an inverter having a housing which is subdivided by a separating wall into two chambers. The electronic components of the inverter are arranged sealed in one of the housing chambers, while the heat sinks for the heat-generating electronic components project into the other housing chamber. Cooling air is blown through this other housing chamber by way of a fan, flows around the heat sinks for the electronic components, and cools them. The need for a separating wall between the actual component and the heat sink for the electronic components makes their installation in the inverter relatively complex.

SUMMARY OF THE INVENTION

It is accordingly an object of the invention to provide a solar inverter, which overcomes the above-mentioned disadvantages of the heretofore-known devices and methods of this general type and which, while having a simple design, ensures adequate cooling of its electronic components, and at the same time satisfies a high ingress-protection class.

With the foregoing and other objects in view there is provided, in accordance with the invention, a solar inverter assembly, comprising:

a first housing part forming a heat sink, the first housing part having a first air inlet opening, a first air outlet opening, and a first air channel connecting the first air inlet opening to the first air outlet opening formed therein and disposed to enable air to flow by natural convection through the first air channel;

a second housing part configured for holding electronic components of the solar inverter, the second housing part having a second air inlet opening, a second air outlet opening, and a second air channel connecting the second air inlet opening to the second air outlet opening formed therein and disposed to enable air to flow by natural convection through the second air channel;

a plurality of electronic components of the solar inverter including at least one first electronic component substantially insensitive to dust and at least one second electronic component substantially sensitive to dust;

the at least one first electronic component being mounted in the second housing part in direct thermal contact with the first housing part, and disposed in the second air channel in the second housing part; and the at least one second electronic component being mounted in the second housing part in thermal contact with the first housing part and disposed in a dust-tight zone separated from the second air channel by a separating wall.

In other words, the solar inverter has a first housing part, which is used as a heat sink, and a second housing part for holding electronic components of the solar inverter. The first housing part has a first air inlet opening, a first air outlet opening and a first air channel which connects the first air inlet opening to the first air outlet opening, which are designed and/or arranged in such a manner that air flows on the basis of natural convection through the first air channel; and the second housing part has a second air inlet opening, a second air outlet opening and a second air channel which connects the second air inlet opening to the second air outlet opening, which are designed and/or arranged in such a manner that air flows on the basis of natural convection through the second air channel. At least one electronic component (for example a transformer or inductor), which is insensitive to dust in the solar inverter is mounted in the second housing part in direct thermal contact with the first housing part, and is arranged within the second air channel in the second housing part; those electronic components of the solar inverter which are sensitive to dust are arranged in the second housing part, separated in a dust-tight manner by a separating wall from the second air channel, and make thermal contact with the first housing part.

Those electronic components of the solar inverter which are sensitive to dust do not make contact with the cooling air flow, so that the solar inverter satisfies a high ingress protection class. Those electronic components of the solar inverter which are insensitive to dust, such as a transformer and inductor, are cooled not only by the direct thermal contact with the heat sink but also directly by means of a cooling air flow, so that the solar inverter has very high cooling power for its electronic components. A further advantage of the solar inverter is that the cooling air flows through the first air channel of the heat sink and the second air channel in the second housing part by natural convection, with the convection being assisted in particular by the long, thin design of the solar inverter. This means that there is no need to install an additional fan, which in general does not have a very long life, and thus restricts the operational reliability of the solar inverter. It is particularly advantageous that the lack of a fan makes it possible to considerably reduce the noise emission from the solar inverter.

In one embodiment of the invention, the second air channel is connected via a labyrinth channel to the second air inlet opening and/or to the second air outlet opening. A labyrinth channel such as this reduces the ingress of foreign bodies and water spray into the interior of the second housing part, so that those electronic components which are insensitive to dust in the second air channel are also adequately protected against moisture and foreign bodies, such as dust.

In one refinement of the invention, the second air inlet opening is arranged on the lower face of the second housing part, and the second air outlet opening is arranged on the upper face of the second housing part, as a result of which the natural convection is assisted by the second air channel.

A fan which can be switched on selectively can be provided in the second air channel, for extreme solar inverter operating conditions.

In one preferred refinement of the invention, the first air channel extends essentially in a straight line between the first air inlet opening and the first air outlet opening of the first housing part, and the first air inlet opening is arranged on the lower face of the first housing part, while the first air outlet opening is arranged on the upper face of the first housing part, thus assisting the natural convection through the first air channel.

Those electronic components of the solar inverter which are sensitive to dust are preferably arranged in an assembly, which is encapsulated in a dust-tight manner, in the second housing part.

Other features which are considered as characteristic for the invention are set forth in the appended claims.

Although the invention is illustrated and described herein as embodied in solar inverter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The FIGURE is a highly simplified, schematic sectional view of a preferred exemplary embodiment of the solar inverter assembly according to the invention.

DESCRIPTION OF THE PREFERRED EMBODIMENTS

Referring now to the sole FIGURE of the drawing in detail, the solar inverter, which is identified with numeral 10 in general, has a first housing part 12, which is used as a heat sink, and a second housing part 14 for holding the electronic components of the solar inverter 10.

The first housing part 12 is substantially in the form of a flat, cuboid body composed of heat-conductive material such as aluminum. That wall 22 of the first housing part 12 which faces the second housing part 14 must, in particular, be designed to be thermally conductive. A first air inlet opening 16 is formed on the lower face of the first housing part 12, and a first air outlet opening 18 is formed on the upper face of the first housing part 12. A first air channel 20 extends between the first air inlet opening 16 and the first air outlet opening 18, and runs substantially in a straight line vertically upwards. The design of the first housing part, which acts as a heat sink, results in an air flow (represented by arrows A in the FIGURE) through the first air channel 20 on the basis of natural convection, without any need to provide a fan.

The second housing part 14 is formed by one wall 22 of the first housing part 12 and by a cover 15. The latter is composed of plastic, for example. An electronic display apparatus 42 is also integrated in or fitted to the cover 15. The interior of the second housing part 14 is not connected to the interior of the first housing part 12, that is to say to the first air channel 20.

A second air inlet opening 24 is provided on the lower face of the second housing part 14, and a second air outlet opening 26 is provided on the upper face of the second housing part 14. The second air inlet opening 24 is connected via a second air channel 28 through the second housing part 14 to the second air outlet opening 26. A transformer 34 and an inductor 36 are mounted directly on the thermally conductive wall 22 of the first housing part within this second air channel 28. Although the second air channel 28 does not run in a straight line upwards through the second housing part 14, air nevertheless flows on the basis of natural convection through the second air channel 28 without any need to provide a fan. This convection flow is indicated by arrows B in the FIGURE.

The heat-generating electronic components 34 (transformer) and 36 (inductor) are cooled not only by the direct thermal contact with the heat sink 12 but also by the air flow B, flowing around them, through the second air channel 28. In order to ensure adequate cooling of these electronic components 34, 36 even in extreme operating conditions of the solar inverter 10, a fan 43 may be additionally arranged in the second air channel 28 of the second housing part 14. The fan 43 is preferably thermostat-operated or it may be switched in by the system sporadically on continued operation. Since the fan 43 may be switched on only when required, the operational reliability of the solar inverter 10 is not adversely affected by the restricted life of the fan, as would be the case if it were to be used continuously, as is required in conventional solar inverters, as described initially. Furthermore, the noise emission is reduced considerably when the fan is switched off, or it is not present at all.

The transformer 34 and the inductor 36 can be arranged within the second air channel 28, since they can be designed to be sufficiently insensitive to dust and moisture, with an acceptable level of complexity. In order to improve the protection of these electronic components 34, 36 in the second air channel 28 against the ingress of dust and moisture, an additional labyrinth channel 30 can be arranged in the area of the second air inlet opening 24 and/or in the area of the second air outlet opening 26 (only the labyrinth channel 30 beside the second air outlet opening 26 is illustrated in the FIGURE). A labyrinth channel 30 such as this makes it harder, as is known, for dust, dirt and moisture to enter, thus improving the ingress-protection class of the solar inverter 10, and reducing the requirements for the ingress-protection class of the electronic components 34, 36 in the second housing part 14 itself.

By way of example, the labyrinth channel 30 is integrated in the cover 15 of the second housing part 14, or in the separating wall 32, which will be described later, of the second housing part 14.

The natural or free convection in the first air channel 20 and in the second air channel 28 is in each case assisted by the design, which is long and slim in the vertical direction, of the first and second housing parts 12, 14.

Those electronic components 38 of the solar inverter 10 which are sensitive to dust, in particular including the heat-generating power semiconductors, are arranged in the second housing part 14, separated from the second air channel 28 in a dust-tight and moisture-tight manner, by means of a separating wall 32. Furthermore, these electronic components are integrated in a dust-tight and moisture-tight, encapsulated assembly, which is supported via a mount 40 on the heat sink 12, or its wall 22.

The second air channel 28 in the second housing part 14 is thus formed in particular by the wall 22 of the heat sink 12, the separating wall 32 of the second housing part 14, and the encapsulated electronic assembly 38. The separating wall 32 in the second housing part 14 separates the dust-sensitive area from the area which is less sensitive to dust, or is insensitive to dust.

The heat-generating electronic components of this assembly 38, and its heat sink, are thermally conductively connected via the mount 40, or with its aid, to the wall 22 of the heat sink 12, in order to be cooled. In this case, the mount 40 itself is preferably not thermally conductive. The mount 40 illustrated herein is a cylinder which is dust-tight and which may also house some of the electronic components. In that case, some of the electronic components 38 may be mounted in direct thermal contact with the heat sink wall 22.

Those electronic components 38 of the solar inverter 10 which are sensitive to dust are therefore cooled solely by the thermal contact of the heat sink 12 and do not come into contact either with the air flow through the first air channel 20 in the first housing part 12, or with the air flow through the second air channel 28 in the second housing part 14.

The invention claimed is:

1. A solar inverter assembly, comprising:
   a first housing part forming a heat sink, said first housing part having a first air inlet opening, a first air outlet opening, and a first air channel connecting said first air inlet opening to said first air outlet opening formed therein and disposed to enable air to flow by natural convection through said first air channel;
   a second housing part configured for holding electronic components of the solar inverter, said second housing part having a second air inlet opening, a second air outlet opening, and a second air channel connecting said second air inlet opening to the second air outlet opening formed therein and disposed to enable air to flow by natural convection through said second air channel;
   a plurality of electronic components of the solar inverter including at least one first electronic component having a quality making it substantially insensitive to dust and at least one second electronic component having a quality making it substantially sensitive to dust;
   said at least one first electronic component being mounted in said second housing part in direct thermal contact with said first housing part, and disposed in said second air channel in said second housing part; and
   said at least one second electronic component being mounted in said second housing part in thermal contact with said first housing part and disposed in a dust-tight zone separated from said second air channel by a separating wall;
   wherein said at least one second electronic component that is substantially sensitive to dust is one of a subset of the plurality of electronic components;
   wherein the subset of the plurality of electronic components is part of an assembly that is encapsulated in a dust-tight enclosure in said second housing part; and
   wherein said dust-tight enclosure in said second housing part is mounted to a wall of said first housing part, and at least one of the subset of said plurality of electronic components disposed in said dust-tight enclosure is mounted in direct thermal contact on said wall of said first housing part.

2. The solar inverter assembly according to claim 1, which comprises a labyrinth channel connecting said second air channel to at least one of said second air inlet opening and said second air outlet opening.

3. The solar inverter assembly according to claim 1, wherein said second air inlet opening is formed in a lower face of said second housing part, and said second air outlet opening is formed in an upper face of said second housing part.

4. The solar inverter assembly according to claim 1, which further comprises a fan disposed in said second air channel to be switched on and off selectively.

5. The solar inverter assembly according to claim 1, wherein said first air channel extends substantially in a straight line between said first air inlet opening and said first air outlet opening.

6. The solar inverter assembly according to claim 1, wherein said first air inlet opening is formed in a lower face of said first housing part, and said first air outlet opening is formed in an upper face of said first housing part.

7. The solar inverter assembly according to claim 1, wherein said at least one first electronic component that is substantially insensitive to dust is a transformer and/or an inductor.

8. The solar inverter assembly according to claim 1, wherein said at least one second electronic component that is substantially sensitive to dust contains power semiconductors.

* * * * *